(12) United States Patent
Drew

(10) Patent No.: US 10,274,048 B2
(45) Date of Patent: Apr. 30, 2019

(54) GEAR SYSTEM

(71) Applicant: Christopher Drew, Fort Knox, KY (US)

(72) Inventor: Christopher Drew, Fort Knox, KY (US)

( * ) Notice: Subject to any disclaimer, the term of this patent is extended or adjusted under 35 U.S.C. 154(b) by 166 days.

(21) Appl. No.: 15/477,349

(22) Filed: Apr. 3, 2017

(65) Prior Publication Data

US 2017/0284507 A1   Oct. 5, 2017

Related U.S. Application Data

(60) Provisional application No. 62/317,730, filed on Apr. 4, 2016.

(51) Int. Cl.
*F16H 1/46* (2006.01)
*F03D 15/00* (2016.01)

(52) U.S. Cl.
CPC .............. *F16H 1/46* (2013.01); *F03D 15/00* (2016.05); *F05B 2260/402* (2013.01)

(58) Field of Classification Search
CPC ..... F16H 3/66; F16H 1/46; F16H 1/24; F16H 1/12; F16H 1/22; F16H 1/28; F16H 3/64; F16H 1/2836; F16H 1/203; F16H 1/206; F16H 3/087; F16H 37/022; F16H 2049/008; F03B 15/00; F05B 2260/402
USPC ..... 74/63, 745, 416, 431, 432, 434; 475/903
See application file for complete search history.

(56) References Cited

U.S. PATENT DOCUMENTS

| | | | |
|---|---|---|---|
| 3,142,730 A | * | 7/1964 | Slonneger ............ H01H 43/125 200/38 C |
| 4,269,563 A | | 5/1981 | Sharak et al. |
| 4,318,019 A | | 3/1982 | Teasley et al. |
| 7,296,495 B2 | * | 11/2007 | Quinn ...................... F16H 1/46 475/330 |
| 7,789,793 B2 | | 9/2010 | Koleoglou |
| D639,199 S | * | 6/2011 | Liberman .................... D11/26 |
| 8,777,802 B2 | | 7/2014 | Erno et al. |
| 2003/0073537 A1 | | 4/2003 | Lloyd |
| 2012/0133148 A1 | | 5/2012 | Romeo |

* cited by examiner

*Primary Examiner* — Jake Cook
*Assistant Examiner* — Bobby Rushing, Jr.
(74) *Attorney, Agent, or Firm* — Global Intellectual Property Agency, LLC; Daniel Boudwin

(57) ABSTRACT

A gear system. The gear system includes a tiered base defining a plurality of circular platforms, wherein each platform includes a distinct diameter. The platforms are arranged in a stacked configuration in order of decreasing diameter from a lowermost platform to an uppermost platform. A plurality of rings are stacked on the platforms, each ring having an inner side with a plurality of gears thereon, wherein each gear is freely rotatable about an axle extending radially inwardly from the inner side of each ring. A ring track is disposed on a lower surface of each ring and a platform track is disposed on an upper surface of each circular platform. Each gear engages both a platform track and a ring track. Each ring increases in rotational speed with respect to a below ring, allowing the gear system to increase the output speed of a motor with minimal loss of torque.

11 Claims, 6 Drawing Sheets

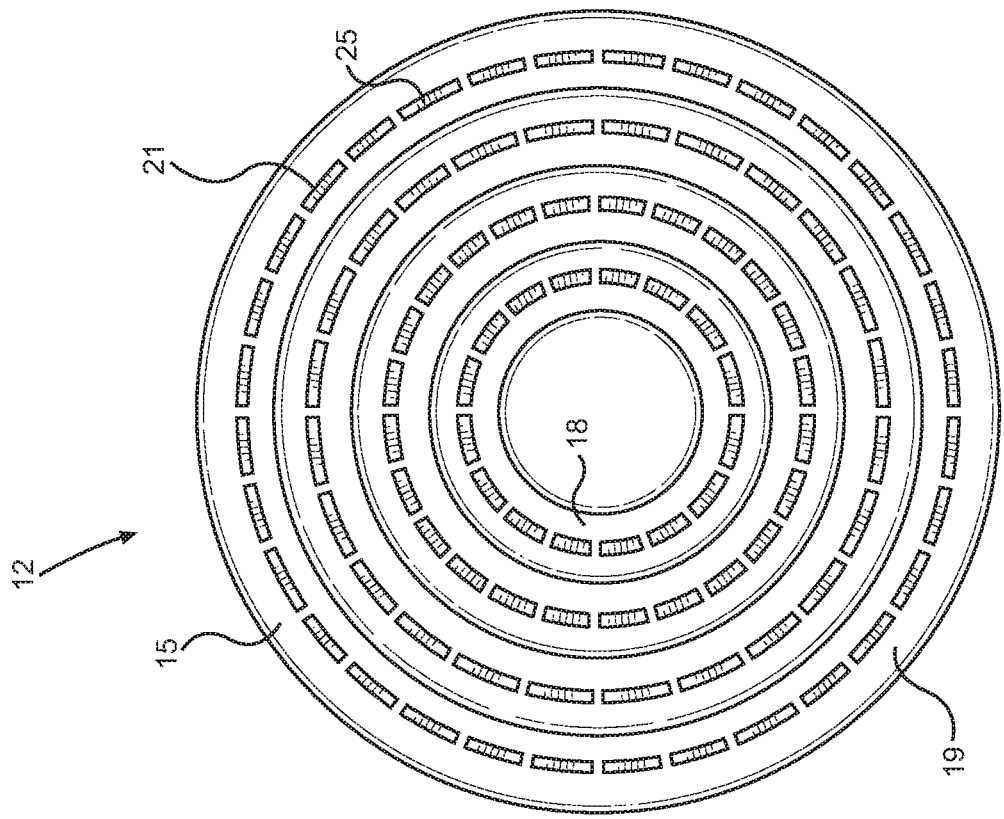
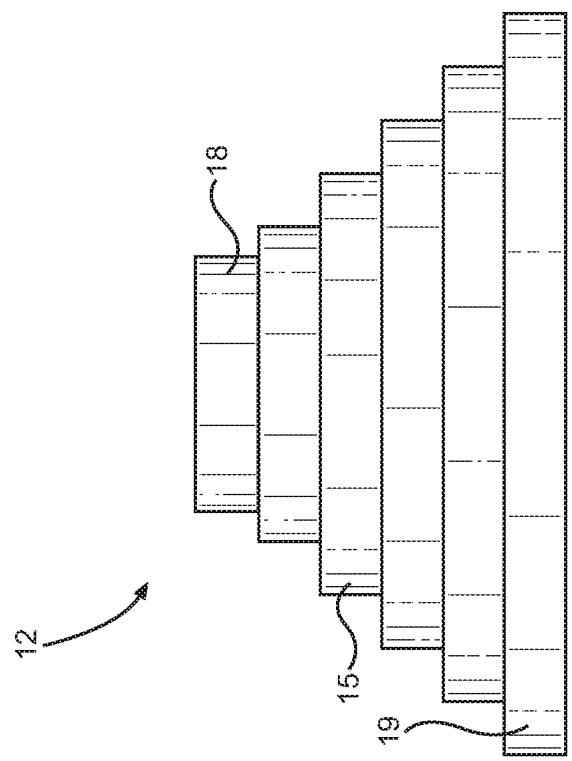

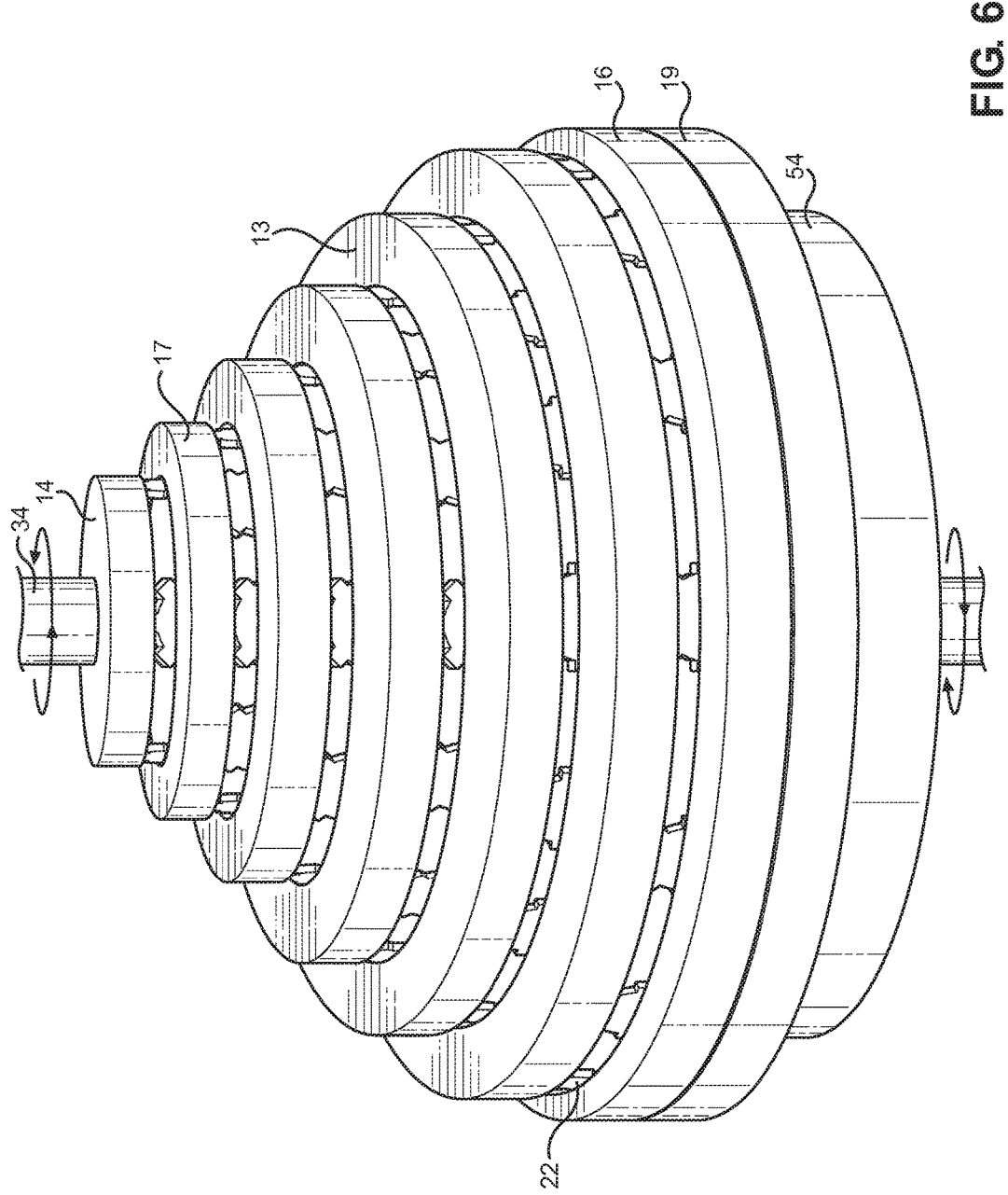

GEAR SYSTEM

CROSS REFERENCE TO RELATED APPLICATIONS

This application claims the benefit of U.S. Provisional Application No. 62/317,730 filed on Apr. 4, 2016. The above identified patent application is herein incorporated by reference in its entirety to provide continuity of disclosure.

FIELD OF THE INVENTION

The present invention relates to gear systems. More specifically, the present invention provides a gear system configured to increase the output speed of a motor with minimal loss of torque.

BACKGROUND OF THE INVENTION

Many modern devices utilize a motor having rotational output, such as a rotating shaft. Some applications require a higher output speed than a motor is capable of achieving on its own. The motor may only be configured to output at a single speed, or may not have an output speed high enough for the particular application. For example, a wind turbine must spin at a particular speed in order to efficiently generate electricity. If there is not enough wind to rotate the turbine at the required speed, there needs to be a mechanism for increasing the speed of the turbine. Therefore, it is desirable to provide a new and improved gear system that increases the output speed of a motor with minimal loss of torque.

Devices have been disclosed in the known art that relate to gear systems. These include devices that have been patented and published in patent application publications. These devices generally relate to torque compensators and planetary gear systems.

The devices in the known art have several drawbacks. These devices are mainly limited in use with any generic motor connectable to a drive as an output means. These devices also generally relate to planetary gears which require high input speeds and function with a higher loss of torque. Further, the devices in the known art fail to provide a gear system that increases the output speed of a motor with a minimal loss of torque.

In light of the devices disclosed in the known art, it is submitted that the present invention substantially diverges in design elements from the known art and consequently it is clear that there is a need in the art for an improvement to existing gear systems. In this regard the present invention substantially fulfills these needs.

SUMMARY OF THE INVENTION

In view of the foregoing disadvantages inherent in the known types of gear systems now present in the prior art, the present invention provides a gear system wherein the same can be utilized for providing convenience for the user when increasing the output speed of a motor while preserving torque.

The gear system includes a tiered base defining a plurality of circular platforms, wherein each of the plurality of circular platforms includes a distinct diameter. The plurality of circular platforms are arranged in a stacked configuration in order of decreasing diameter from a lowermost platform to an uppermost platform. The gear system further includes a plurality of rings, wherein one of the plurality of rings corresponds to and is disposed on one of the circular platforms. Each of the plurality of rings comprises an inner side facing an open inner portion. The inner side includes a plurality of gears disposed annularly thereon, wherein each gear is independently rotatable about an axle extending radially inwardly from the inner side of each ring. A ring track is disposed annularly about a lower surface of each ring, and a platform track is disposed annularly about an upper surface of each platform. Each individual ring is stacked on one of the plurality of circular platforms, such that each gear of the individual ring engages the platform track of a lower platform and a ring track of an above-located ring. The rings are stacked such that the lower rings have a diameter greater than the upper rings and correspond to the decreasing diameter of the plurality of circular platforms.

The output of a motor is operably connected to the lowermost ring via a mechanism such as a drive belt. When the motor causes the drive belt to rotate the lowermost ring, the gear wheels engage with the track of an above-located ring, thereby causing that ring to rotate in the same direction as the lowermost ring. The above-located ring is smaller in diameter, and rotates faster than the lowermost ring. The next above-located ring then rotates faster than the previous lower ring, such that the next above-located ring has a much greater gear ratio with respect to the lowermost ring. The more rings that are utilized, the greater the speed increase from the input. Further, the more gears that are disposed along the inner edge of the ring, the more torque is preserved. An output mechanism such as a drive belt or drive shaft is then operably connected to the uppermost ring. The output speed depends on the number of rings utilized, but is always greater than the input speed while preserving torque.

One object of the present invention is to provide a new and improved gear system that has fewer disadvantages of prior art gear systems.

Another object of the present invention is to provide a gear system configured to increase the output speed of a motor while preserving the torque provided by the motor.

A further object of the present invention is to provide a gear system configured to increase the output speed of a motor and arrange the output in either a parallel or perpendicular configuration, wherein the perpendicular configuration provides an output in the same direction of rotation as the input, and wherein the parallel configuration provides an output in opposing direction of the input from the motor.

Other objects features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1A shows a side view of the tiered base portion of the gear system.

FIG. 1B shows a top view of the tiered base portion of the gear system.

FIG. 6 shows a side view of an alternative embodiment of the gear system.

DETAILED DESCRIPTION OF THE INVENTION

Figure 2:
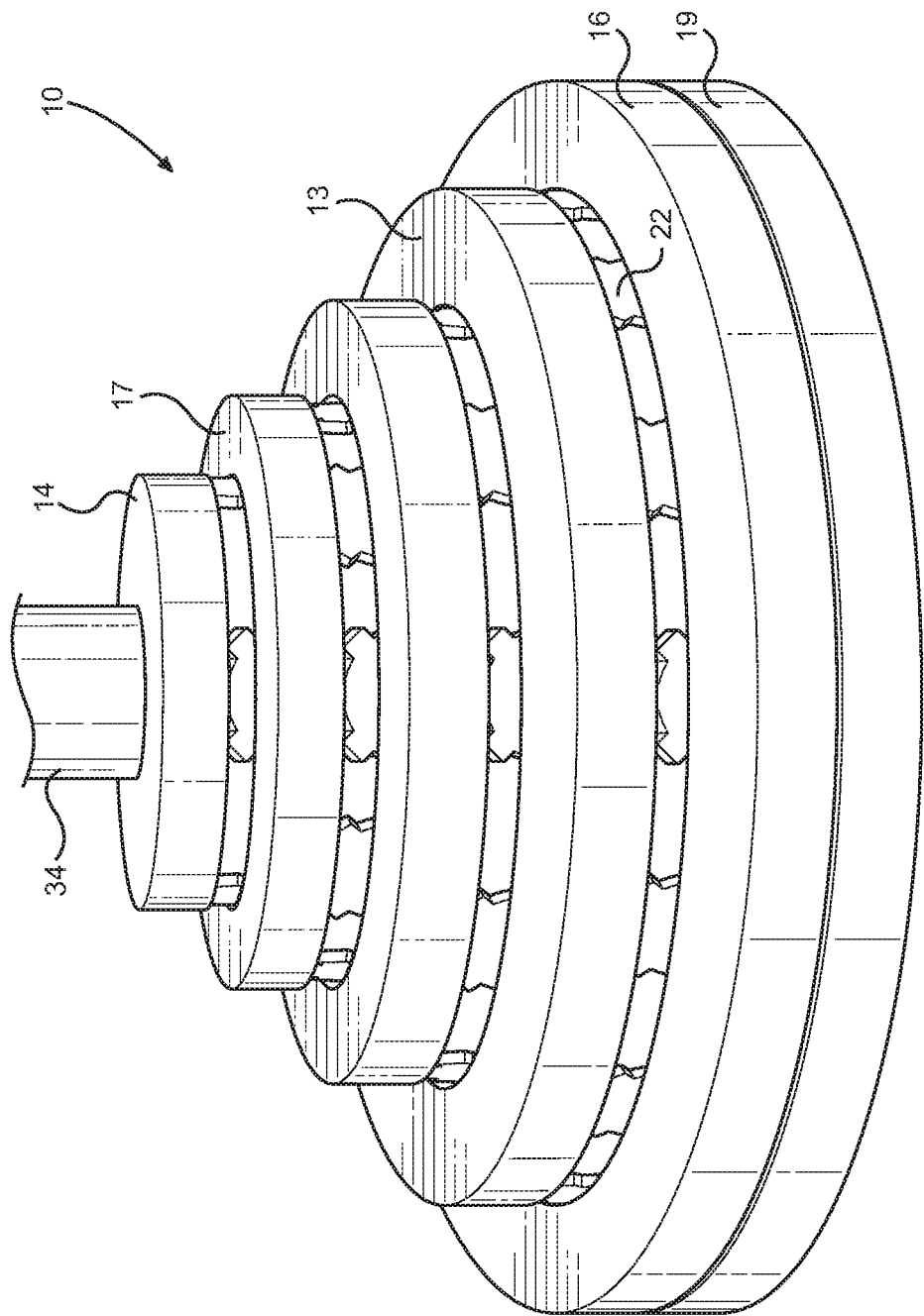
FIG. 2 shows a perspective view of one embodiment of the gear system.

Reference is made herein to the attached drawings. Like reference numerals are used throughout the drawings to depict like or similar elements of the gear system. For the purposes of presenting a brief and clear description of the present invention, the preferred embodiment will be discussed as used for increasing the output speed of a motor while minimizing loss of torque. The figures are intended for representative purposes only and should not be considered to be limiting in any respect.

Figure 5:
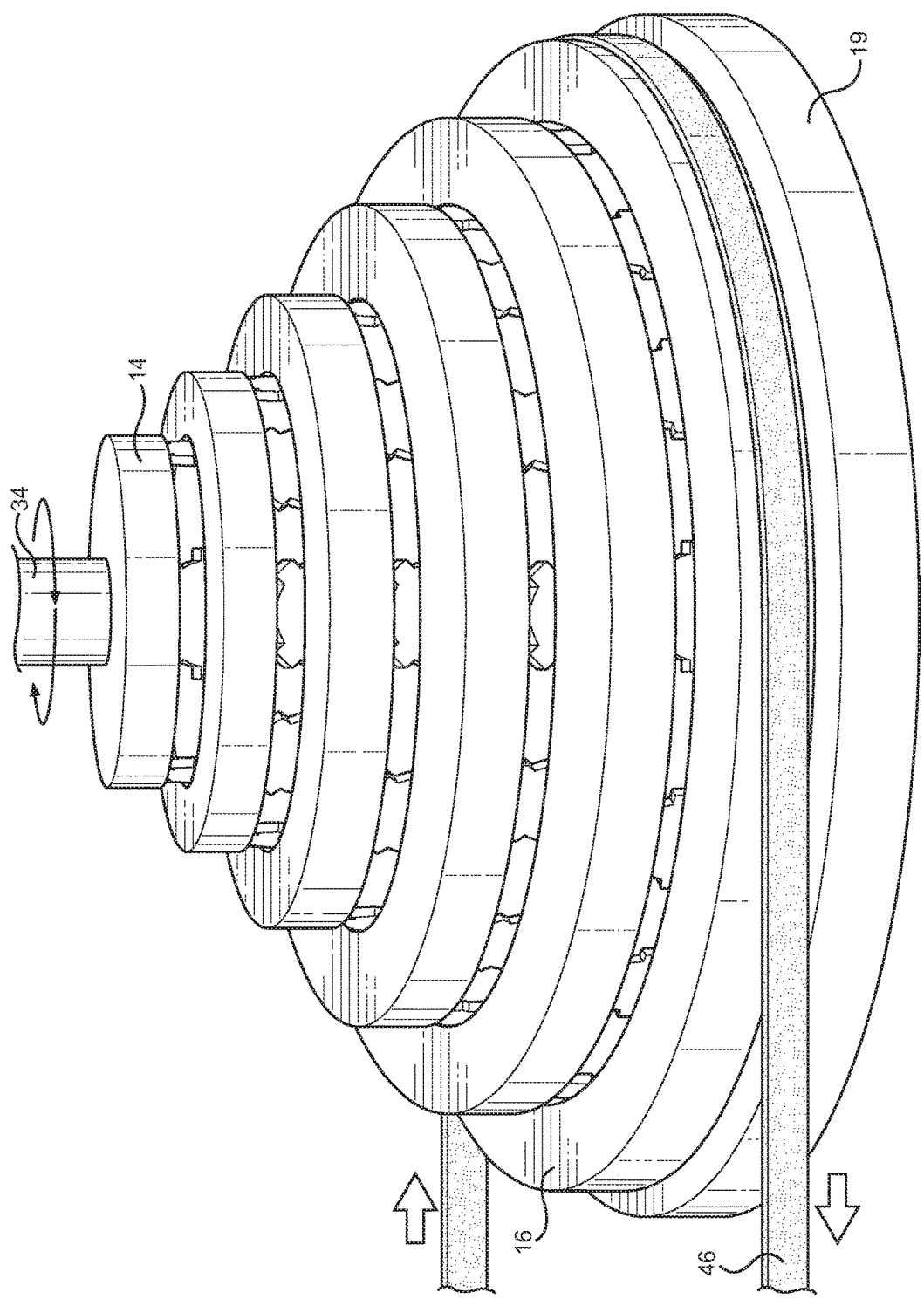
FIG. 5 shows a side view of one embodiment of the gear system.

Referring now to FIGS. 1A and 1B, there are shown side and top views of the tiered base portion of the gear system. The gear system generally comprises a tiered base 12 that supports a plurality of individual rings thereon, thereby forming an assembly of individual rings, or a ring assembly for short. The individual rings are not shown in FIGS. 1A and 1B so that the tiered base 12 and its platforms 15 are visible. In the illustrated embodiment, the tiered base 12 includes a plurality of circular platforms 15, wherein each platform 15 includes a distinct diameter. The embodiment shown in FIG. 1B includes four platforms, while the embodiment shown in FIG. 1A includes six platforms. In all embodiments, the plurality of circular platforms 15 are arranged in a stacked configuration in order of decreasing diameter from a lowermost platform 19 to an uppermost platform 18, thereby defining the tiered configuration of the base 12, similar to a wedding cake. Each of the plurality of circular platforms 15 supports an individual ring thereon, as shown in FIGS. 2, 5, and 6. Further, each circular platform 15 includes a track 21 thereon, the track 21 having détentes 25 for receiving individual teeth of the gear wheels of the individual rings.

Referring now to FIG. 2, there is shown a perspective view of one embodiment of the gear system. The plurality of rings 13 include unique individual rings that correspond in diameter to the plurality of circular platforms 15, such that each individual ring 13 is coextensively aligned with a corresponding circular platform 15 when mounted thereon. Each ring 13 includes a plurality of gear wheels 22 disposed annularly along an inner edge thereof. When an individual ring 13 is mounted onto a corresponding circular platform 15, the gear wheels 22 support the ring 13 thereon, while also supporting an above ring 13 via engagement with a track thereon.

In the illustrated embodiment, the lowermost ring 16 can be configured to receive a drive belt on an outer edge thereof, wherein the drive belt is operably connected to a generator or other type of motor. Alternatively, the lowermost ring 16 can be powered by a drive mechanism 54. An output member 14 is supported by the gears 22 of the uppermost ring 17. The output member 14 can include a shaft 34 extending therefrom, or can receive a drive belt on an outer edge thereof. When a drive mechanism 54 rotates the lowermost ring 16, the gears 22 of the lowermost ring 16 engage a ring 13 positioned immediately above it, thereby causing the above-located ring 13 to rotate in the same direction as the lowermost ring 16. The above-located rotates faster than the lowermost ring 16. The next ring 13 in the gear system 10, or the third ring in the depicted embodiment, is smaller in diameter than the ring 13 below it, and has an even greater rotational speed than the lowermost ring 16. This pattern continuous as the rings 13 continue upward. The more rings 13 that are utilized, the greater the speed increase achieved. The final output speed of the output member 14 is thus determined by the number of rings 13 utilized, but is always greater than the input speed, which is the speed of rotation of the lowermost ring 16.

Figure 3A:
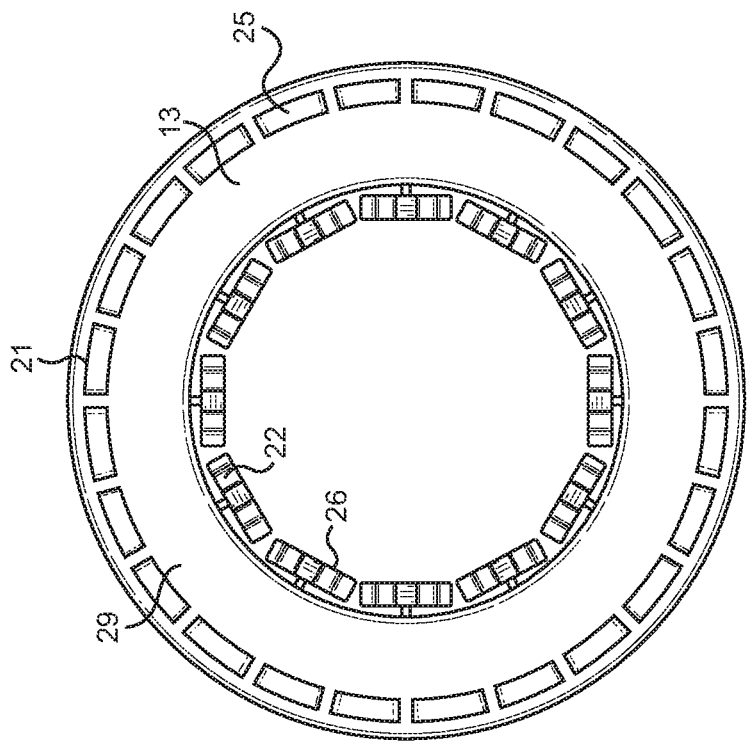
FIG. 3A shows a top view of a ring of the gear system.
Figure 3B:
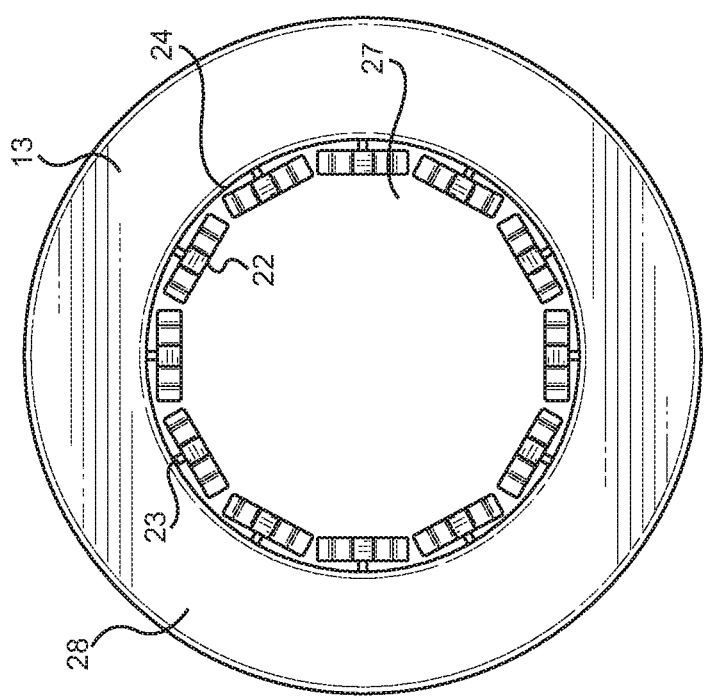
FIG. 3B shows a bottom view of a ring of the gear system.

Referring now to FIGS. 3A and 3B, there is shown a top view and a bottom view of one of the rings of the gear system. Each ring 13 includes an upper side 28 and a lower side 29. Each ring 13 further includes an inner edge 24 surrounding an open inner portion 27. A plurality of gears 22 are disposed annularly about the inner edge 24. Each gear 22 does not contact an adjacent gear 22, such that they are independent of each other and each gear 22 is configured to rotate freely about an axle 23 extending inwardly toward the open inner portion 27. The number of gears 22 in each ring 13 can vary, but increasing the number of gears 22 decreases the total loss of torque in the system, so it is desirable to provide the greatest amount of gears 22 possible while still ensuring that no adjacent gears 22 contact one another.

As shown in FIG. 3B, the lower side of the ring 13 includes a track 21 thereon, similar to the tracks disposed on each tier of the base. The gears 22 include a plurality of teeth 26 thereon, while the track 21 comprises a rail system. In one embodiment, the rail system includes smooth track 21. In an alternate embodiment, each track 21 includes a plurality of détentes 25 disposed annularly about an outer edge thereof. Each détente 25 is configured to receive an individual gear tooth 26. In this way, when multiple rings are mounted onto the circular platforms to form a ring assembly (shown in FIGS. 2, 5, and 6), one ring 13 rests on the top portion of the gears 22 of the next lower ring 13 such that the gears 22 of the lower ring 13 engage the track 21 on the lower side of the upper ring 13 and the track on the upper side of the platform on which the lower ring 13 is supported.

Figure 4:
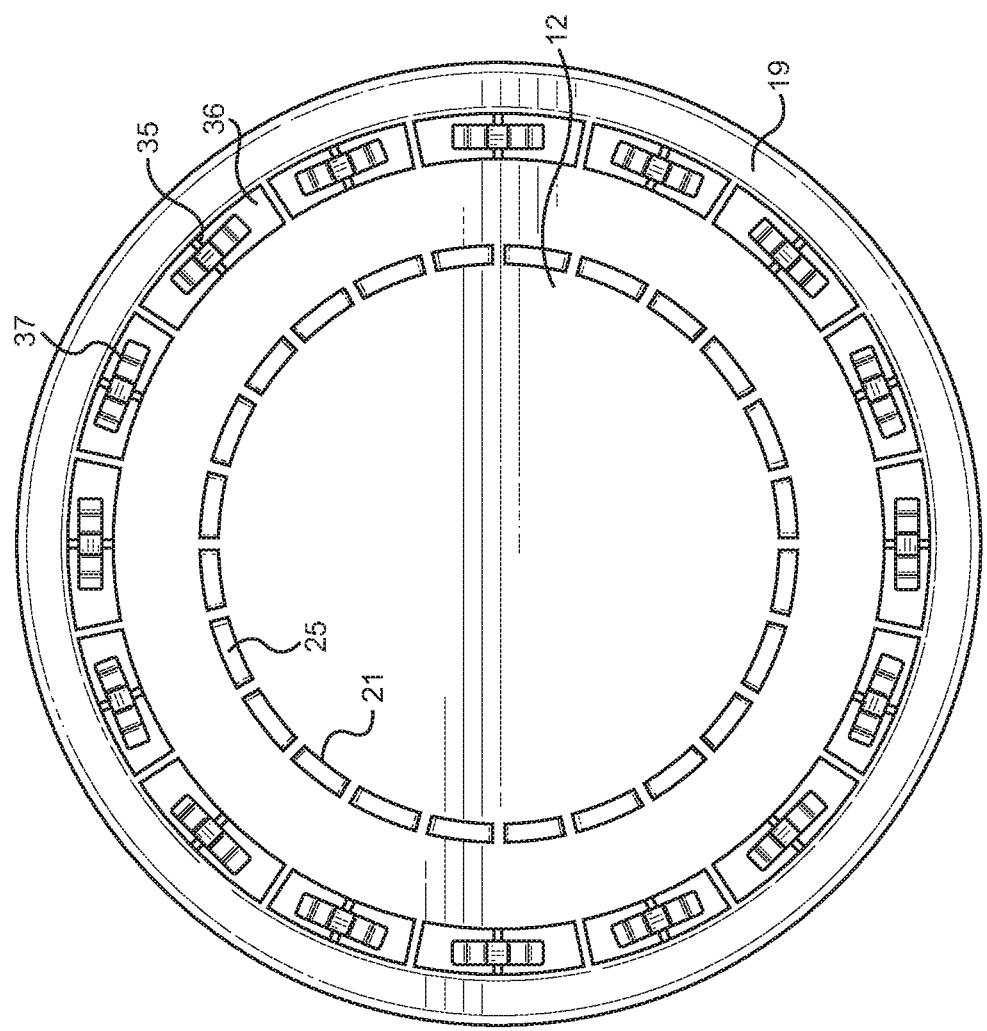
FIG. 4 shows a top view of the lowermost base platform of the gear system.

Referring now to FIG. 4, there is shown a top view of the lowermost base platform of an alternative embodiment of the gear system. In the previously shown embodiments, the output shaft is configured to rotate in the same direction as the input shaft. However, in alternative embodiments, as illustrated in FIG. 3, the lowermost platform 19 of the base 12 is modified so that the output shaft rotates in the opposite direction of the input shaft. The lowermost platform 19 includes a plurality of cutouts 36 that are arranged annularly about an outer edge of the lowermost platform 19 of the base 12. Each cutout 36 includes an axle 35 disposed therein, and further includes a gear 37 that is freely rotatable about its respective axle 35. The lowermost platform 19 still includes the platform track 21 which is disposed on an upper surface of the platform, which may be smooth or may include the déentes 25. In this alternate embodiment, the gear system further includes a secondary input member which is shown in FIG. 6 and described below.

Referring now to FIG. 5, there is shown a perspective view of one embodiment of the gear system. In this embodiment, the output member 14 includes a shaft 34 thereon, and is configured to rotate in the same direction as the lowermost ring 16 of the ring assembly, which receives input motion from an external generator or other motor via an attached drive belt 46. In alternate embodiments, the input motion can be received via a worm gear or other mechanism for rotating the lowermost ring 16, which is supported on the lowermost platform 19.

Referring now to FIG. 6, there is shown a perspective view of an alternate embodiment of the gear system. In this embodiment, the output member 14 is configured to rotate in the opposite direction as the input motion, which is received via a secondary input member 54. The secondary input member 54 includes a track thereon (not visible) that engages the gears 37 that are disposed within the cutouts 36 of the lowermost platform 19 of the base 12. When the secondary input rotates in one direction, it causes the cutout gears 37 to rotate in the same direction, which in turn causes rotation of lowermost ring 16 in an opposite direction. This opposite motion continues upward, such that the output member 14 also rotates in an opposite direction as the secondary input member 54. In this way, the gear system can be configured to achieve an output motion that is in the same direction or in the opposite direction as the input motion, increasing the usability of the gear system.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gear system, comprising:
   a base defining a plurality of circular platforms each including a distinct diameter, wherein the plurality of circular platforms are arranged in a tiered configuration in order of decreasing diameter from a lowermost platform to an uppermost platform;
   a plurality of rings each including an inner side facing an open inner portion, the inner side having a plurality of gears disposed thereon, wherein each gear is freely rotatable about an axle extending radially inwardly from the inner side of each ring;
   a ring track disposed on a lower surface of each of the plurality of rings;
   a platform track disposed on an upper surface of each circular platform;
   wherein the plurality of rings correspond to an individual circular platform of the plurality of circular platforms, such that they are arranged in a tiered configuration in order of decreasing diameter from a lowermost ring to an uppermost ring when mounted on the base;
   wherein the plurality of rings are configured to engage a platform track positioned below it and a ring track positioned above it via their respective plurality of gears.

2. The gear system of claim 1, further comprising an output shaft, wherein the output shaft is connected to an uppermost ring of the plurality of rings.

3. The gear system of claim 1, wherein a lowermost ring of the plurality of rings comprises an outer surface configured to engage a drive belt.

4. The gear system of claim 1, wherein each of the gears includes a plurality of teeth thereon, and wherein the ring track and platform track include a rail system configured to engage the plurality of teeth.

5. The gear system of claim 4, wherein the rail system comprises a smooth surface.

6. The gear system of claim 4, wherein the rail system comprises a plurality of détentes thereon.

7. The gear system of claim 2, wherein the lowermost circular platform includes a plurality of cutouts, the plurality of cutouts arranged in a circular arrangement surrounding a circumference of the lowermost circular platform, each cutout including an axle disposed across a width thereof, each cutout further comprising a gear rotatably connected to the axle.

8. The gear system of claim 2, wherein the output shaft is configured to rotate in a same direction as a lowermost ring of the plurality of rings.

9. The gear system of claim 2, wherein the output shaft is configured to rotate in an opposite direction as a secondary input member.

10. The gear system of claim 7, further comprising an input shaft having a base plate with a track thereon, wherein rotation of the input shaft in a first direction rotates the cutout gears, wherein each of the plurality of rings rotates in a second direction.

11. The gear system of claim 1, wherein each of the plurality of rings is configured to rotate at a greater speed of a lower ring on which it is stacked.

* * * * *